United States Patent [19]

Heytmeijer

[11] 4,432,948

[45] * Feb. 21, 1984

[54] RECOVERY OF YTTRIUM AND EUROPIUM FROM CONTAMINATED SOLUTIONS

[75] Inventor: Herman R. Heytmeijer, Whippany, N.J.

[73] Assignee: U.S. Philips Corporation, New York, N.Y.

[*] Notice: The portion of the term of this patent subsequent to May 13, 2000 has been disclaimed.

[21] Appl. No.: 435,439

[22] Filed: Oct. 20, 1982

Related U.S. Application Data

[63] Continuation-in-part of Ser. No. 403,460, Jul. 30, 1982, Pat. No. 4,386,056.

[51] Int. Cl.$^3$ .............................................. C01F 17/00
[52] U.S. Cl. .................................... 423/21.5; 423/263; 75/101 BE
[58] Field of Search ............................. 423/21.5, 263; 75/101 BE; 252/301.4 R

[56] References Cited

U.S. PATENT DOCUMENTS

| | | | |
|---|---|---|---|
| 2,539,282 | 1/1951 | Spedding et al. | 75/101 BE |
| 2,798,789 | 7/1957 | Spedding et al. | 423/21.5 |
| 2,897,050 | 7/1959 | Jaffe . | |
| 2,956,858 | 10/1960 | Spedding et al. | 423/263 |
| 3,033,646 | 5/1962 | Hansen | 423/21.5 |
| 3,037,841 | 6/1962 | Krumholz | 423/21.5 |
| 3,167,389 | 1/1965 | Woyski . | |
| 3,228,750 | 1/1966 | Lindstrom et al. | 423/21.5 |
| 3,455,646 | 7/1969 | Morton | 423/21.5 |
| 3,615,173 | 10/1977 | Winget et al. . | |
| 3,635,658 | 1/1972 | Ferri et al. | 423/263 |
| 3,692,500 | 9/1972 | Eoupat et al. . | |
| 3,763,050 | 10/1973 | Dikjoff et al. . | |
| 3,864,273 | 2/1975 | Forbes et al. . | |
| 3,941,714 | 3/1976 | Mathers et al. . | |
| 3,954,657 | 5/1976 | Forest et al. . | |

FOREIGN PATENT DOCUMENTS 862688   3/1961   United Kingdom ........... 75/101 BE

OTHER PUBLICATIONS

Powell, "Progress in the Science & Technology of the Rare Earths" vol. 1, The Macmittan Co., N.Y., 1964, pp. 62–68.

Primary Examiner—Herbert T. Carter
Attorney, Agent, or Firm—Norman N. Spain

[57] ABSTRACT

A procedure is given for recovering yttrium and europium from phosphors or solutions which have become contaminated. An acid solution containing the yttrium, europium and impurities is passed through a cation resin exchange column until there is no longer a difference between the contaminated and effluent liquids. Yttrium and europium are then stripped from the resin exchange column using a concentrated hydrochloric acid solution. The hydrochloric acid solution containing the yttrium and europium is heated with oxalic acid to produce yttrium and europium oxalate and the oxalate is fired to produce yttrium and europium oxide.

3 Claims, No Drawings

RECOVERY OF YTTRIUM AND EUROPIUM FROM CONTAMINATED SOLUTIONS

CROSS-REFERENCE TO RELATED APPLICATION

This application is a continuation-in-part of application Ser. No. 403,460, filed July 30, 1982, now U.S. Pat. No. 4,386,056, by the present inventor and owned by the present assignee.

BACKGROUND OF THE INVENTION

This invention discloses a method for recovering the trivalent rare earth materials yttrium and europium from a contaminated phosphor or solution.

The rare earth elements have use as phosphor and phosphor activators for electric discharge lamps and cathode ray tubes. Because these elements are costly, recovery from washing solutions and contaminated phosphors is highly desirable. The process described herein is useful in two circumstances encountered in the manufacture of phosphors. The first where washing solutions have carried away yttrium and europium as well as contaminants, and the second where yttrium and europium are reclaimed from contaminated phosphors in an acid solution.

The prior art discloses methods that use the ion exchange method as well as other methods to obtain particular rare earth elements. Those methods utilizing ion exchange, however, relate solely to the separation of rare earth elements from one another and not from contaminants with valences other than plus three.

In U.S. Pat. No. 2,897,050 dated July 28, 1959, there is disclosed a method for the ion exchange separation of rare earth elements. This method separates rare earths by absorbing an aqueous solution of water soluble inorganic rare eath salts on sulfonated polystyrene cation exchange resins and passing an eluting agent through such a column to cause the solution to separate into bands of individual rare earth salts. Passing the eluting agent through the column causes the rear earth salts to separate into sharply defined, visibly distinct regular horizontal colored bands which may be readily separated from one another.

In U.S. Pat. No. 3,167,389 dated Jan. 26, 1965, there is disclosed a method for ion exchange separation of rare earths including yttrium that is capable of being performed on a continuous basis that allows reuse of the eluting solution by absorption of the rare earth ions on the resin and using the rare earths and yttrium as their own retainer.

In U.S. Pat. No. 3,615,173 dated Oct. 26, 1971, there is disclosed a method for ion exchange separation of rare earths using DTPA (diethylenetriaminepentaacetic acid) or HEDTA (hydroxyethylethlene-diaminetriacetic acid) as the retaining agent on the cation exchange column using EDTA (ethylenediaminetetraacetic acid) as the eluant.

In U.S. Pat. No. 3,692,500 dated Sept. 19, 1972, there is disclosed a method for ion exchange separation of lanthanide rare earths and transplutonium elements in aqueous solution using nitrate ions and alcohol, passing the mixture through an anion exchange resin, and eluting with a solution of nitrate ions, alcohol, and complexing agent.

In U.S. Pat. No. 3,763,050 dated Oct. 2, 1973, there is disclosed a method for recovery of rare earth phosphor from a mixture containing a sulfide or selenide of zinc or cadmium by treating with an aqueous alkaline solution of a hypohalogenite with a pH greater than 12 and washing with water.

In U.S. Pat. No. 3,864,273 dated Feb. 4, 1975, there is disclosed a method for recovery of rare earth phosphors including yttrium from other zinc, cadmium or sulfur phosphors and organic binders by volatilizing the organic binder and slurrying the phosphor in heated hypochlorite solution to convert the sulfide contaminants to oxygen compounds, reacting with ammonium complex to dissolve the oxygen compounds, then physically separating the rare earth phosphor from the dissolved products.

In U.S. Pat. No. 3,941,714 dated Mar. 2, 1976, there is disclosed a method for recovery of the europium activated yttrium oxysulfide from europium activated yttrium oxide and other, non-rare earth, phosphors by reaction of the oxide with sulfur, heating to produce europium-activated yttrium oxysulfides, and then washing.

In U.S. Pat. No. 3,954,657 dated May 4, 1976, there is disclosed a method for recovery of rare earth oxysulfide phosphors including yttrium oxysulfide by washing in dilute nitric, acetic, hydrochloric, or citric acid then washing with sodium tripolyphosphate and collecting the precipitate.

SUMMARY OF THE INVENTION

There is provided a method for recovery of yttrium oxide eruopium activated phosphor in a form that has a quality suitable for use as a lamp coating phosphor. A liquor containing impurities along with the trivalent yttrium and europium is passed through a cation resin exchange column. When the effluent yttrium and europium concentrations and contaminant concentrations are substantially the same as their original concentrations in the original contaminated solution, the column is eluted with deionized water in order to remove the excess yttrium and europium bearing liquor from the column. The column is then stripped with a high concentration acid and rinsed with deionized water. The solution thus obtained from the column contains yttrium, europium and chloride ions. The solution is heated and oxalic acid is added precipitating the yttrium and europium as oxalates. The precipitate is then rinsed, dried and fired from which there is obtained yttrium oxide and europium oxide as phosphor powders. The oxide phosphors thus obtained are suitable for use with the virgin phosphors.

DESCRIPTION OF THE PREFERRED EMBODIMENT

A typical phosphor blend contains a mixture of yttrium oxide europium activated phosphor along with other phosphors which may include zinc silicate with manganese activator, strontium chloro-apatite europium activated, and possibly non-phosphor contaminants, for example antimony trioxide and aluminum oxide. The high cost of yttrium and europium make recovery of these elements from an unusable phosphor blend desirable.

If the phosphor blend has been combined with a binder, the binder must first be removed. In an extreme case the phosphor blend will have gelled with an aqueous hydroxyethylcellulose binder and must be reclaimed by first freezing the gel, defrosting that gel, and centrifuging to remove free water. The phosphor blend and binder remain as curds which are dried and then fired at about 500° C. to burn off the binder and organic additives. As a step in restoring brightness to the phosphor, the reclaimed phosphor is washed with weak acetic acid to remove surface yttrium oxide and europium oxide that is non-fluorescent and to remove contaminates. The acetic acid wash contains some yttrium and europium as well as possible contaminates and is now set aside.

The remaining phosphor is checked for brightness and color and, if acceptable, may be used without further processing. If of unacceptable quality, the phosphor must go through a complete recovery process which consists of dissolving the phosphor in a nitric acid solution, removing the insoluble precipitates by settling, decanting, and filtering the solution. The nitric acid solution is then adjusted to a pH of approximately 1.5 and a specific gravity of approximately 1.06. At this point there are now two acid solutions, the acetic acid washing solution and the nitric acid recovery solution, which go through essentially similar but independent ion exchange processes described as follows.

To the yttrium europium bearing acid solution is added between 3% and 50% concentration with 30% preferred hydrogen peroxide solution in the amount of 0.1% by volume, in order to maintain the yttrium and europium in their highest state of oxidation. The solution is then passed through an exchange column charged with sulfonated styrene divinylbenzene HCR-S-H cation resin, for example a "Barnstead" column charged with 1850 ml of "Dowex" manufactured by the Dow Chemical Company, which has been treated with a dye that changes color to signal resin exhaustion. To assure complete removal of all cations from the solution, both desirable as well as undesirable, the flow rate through the column is maintained at about 13 liters per hour for a liquor that contains approximately 10 grams yttrium oxide per liter. Exhaustion, that is a full charge of a column, is indicated by the color change of the resin. Simultaneously the effluent which up to that point had been free of yttrium, europium, strontium, zinc and other cations starts to show traces of precipitate formation upon addition of oxalic acid solution. This precipitation is further indicated that the resin has been exhausted.

Addition of the yttrium europium bearing acid solution to the resin column is continued after exhaustion of the resin is indicated by a color change. To prevent losses of yttrium and europium, the effluent is retained after indicated resin exhaustion for later processing. Contaminated liquor is no longer added to the column when the effluent yttrium and europium concentrations and the concentrations of the individual contaminants are substantially the same as their concentrations in the original contaminated liquor being added to the column. That is, there is no change between that being sent into the column and that being discharged. The column is now rinsed with deionized water to remove and recover the contaminated yttrium-europium rich liquor that is still in the column to be processed later. The yttrium-europium values are recovered by stripping the resin with a relatively strong acid solution, one having a solution normality greater than 1.0, for example 2.5 normal hydrochloric acid solution, and rinsing the column with 1.5 liters of water. These stripping and rinsing solutions are combined and heated to between 20° C. and 80° C. with the preferred temperature 50° C. after which the europium and yttrium are precipitated as oxalates by the addition of oxalic acid. The product is then filtered off, rinsed with oxalic solution between 0.2% and 5% concentration with 1% preferred, dried and fired between 500° C. and 1000° C. with 840° C. preferred to form europium oxide and yttrium oxide.

When performed on an acetic acid wash, the 1850 ml "Dowex" column charge yields about 100 grams of yttrium and europium oxides with a typical emission spectrographic analysis as follows:

| Element | Weight Percent |
| --- | --- |
| Al | 0.005 |
| Fe | 0.0005 |
| Mg | 0.002 |
| Mn | 0.008 |
| Si | 0.008 |
| Zn | 0.008 |
| Sr | — |

When the complete reclamation process is necessary and nitric acid solution is used, the column yield of oxide is lower resulting in about 80 grams of oxide. Emission spectrographic analysis of the product shows a slightly increased aluminum content and a trace quantity of strontium. The typical full emission spectograph results are as follows:

| Element | Weight Percent |
| --- | --- |
| Al | 0.008–0.02 |
| Fe | 0.0005 |
| Mg | 0.005 |
| Mn | 0.008 |
| Si | 0.008 |
| Zn | 0.008 |
| Sr | 0.08 |

In both of the above reclamation processes the recovered yttrium oxide europium activated phosphor is sufficiently pure to be used as a virgin phosphor.

The ion exchange method described above, when employed on a mixture of yttrium oxide europium activated phosphor which had become contaminated with $YVO_4$ phosphor, tested the ability of this method to separate the yttrium oxide europium-activated phosphor from contaminates with higher valences. Although a high quantity of yttrium oxide europium-activated phosphor can be reclaimed by this ion exchange method, the presence of vanadium not only interferes with the color change of the resin but also reduces the column yield to about 72 grams per charge. The typical spectrographic analysis of the oxide product provides the following results:

| Element | Weight Percent |
| --- | --- |
| Al | 0.002 |
| Fe | — |
| Mg | 0.002 |
| Mn | 0.0002 |
| Si | 0.005 |
| Zn | — |
| Sr | — |

The quantity of vanadium in the reclaimed phosphor is below the limits of detection, which is 10 parts per million. There was, however, lingering color effects of the vanadium on the phosphor rendering the reclaimed phosphor best suited for use with yttrium vanadate phosphors, where it functions entirely satisfactorily.

All of the above reclamation operations were demonstrated on a laboratory sized deionizer and similar results were obtained using a commercial size deionizing column charged with approximately 5 cubic feet of resin.

I claim the following:

1. A method for recovering dissolved yttrium and europium from a solution including same, but which is contaminated with other ions, said method comprising:

adding to said contaminated solution hydrogen peroxide in predetermined amount and concentration sufficient to maintain the europium ions in the trivalent state, passing the resultant solution through a cation resin exchange column at least until the effluent yttrium and europium concentrations and contaminant concentrations are substantially the same as those in said contaminated solution, eluting said exchange column with deionized water to remove therefrom residual contaminated solution, stripping said exchange column by rinsing same with a predetermined amount of inorganic acid solution of sufficient strength to strip the yttrium and europium from the exchange column resin to obtain a strip solution, rinsing said exchange column with deionized water to obtain a rinse solution, combining said strip and rinse solutions to form a value solution, heating said value solution to a predetermined temperature and adding thereto a predetermined amount of oxalic acid to precipitate yttrium oxalate and europium oxalate therefrom, collecting said precipitate of yttrium oxalate and europium oxalate and rinsing same to remove possible residual contaminants, drying, and firing said precipitate to form the recovered yttrium oxide and europium oxide.

2. The method of claim 1 wherein:

the hydrogen peroxide is between 3% and 50% concentration in solution, the cation resin exchange column is of the sulfonated styrene divinylbenzene type, the stripping acid solution has a solution normality greater than 1.0, the value solution is heated to a temperature between 20° C. and 80° C., the precipitate is rinsed with between 0.2% and 5% oxalic acid solution, the yttrium oxalate and europium oxalate are fired at a temperature between 500° C. and 1000° C.

3. The method of claim 2 wherein:

the hydrogen peroxide solution is a 30% $H_2O_2$ solution in the amount 0.1% of said contaminated solution, the exchange column contains 1850 ml of sulfonated styrene divinylbenzene HCR-S-H cation resin, the stripping acid solution is 4 liters of 2.5 N hydrochloric acid, the rinse is performed with 1.5 liters of deionized water, the value solution is heated to 50° C. and 225 grams of oxalic acid are added, the precipitate is rinsed with 1% oxalic acid solution, the yttrium oxalate and europium oxalate are fired at a temperature of 840° C.

* * * * *

UNITED STATES PATENT AND TRADEMARK OFFICE
CERTIFICATE OF CORRECTION

PATENT NO. : 4,432,948
DATED : February 21, 1984
INVENTOR(S) : HERMAN R. HEYTMEIJER It is certified that error appears in the above—identified patent and that said Letters Patent is hereby corrected as shown below:

> On the title page
> (73) Assignee:
>
> Change "U.S. Philips Corporation"
> to --North American Philips Electric Corp. --.

Signed and Sealed this

Third Day of July 1984

[SEAL]

Attest:

GERALD J. MOSSINGHOFF

Attesting Officer

Commissioner of Patents and Trademarks